(12) United States Patent
Lee et al.

(10) Patent No.: US 12,265,751 B2
(45) Date of Patent: Apr. 1, 2025

(54) DISPLAY DEVICE AND OPERATION METHOD THEREOF

(71) Applicant: LG ELECTRONICS INC., Seoul (KR)

(72) Inventors: Eunjung Lee, Seoul (KR); Jinseong Kim, Seoul (KR); Kyungnam Bae, Seoul (KR); Byounghyun Shin, Seoul (KR); Jeonghwan Kwon, Seoul (KR); Taejin Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 18/017,633

(22) PCT Filed: Jul. 24, 2020

(86) PCT No.: PCT/KR2020/095088
§ 371 (c)(1),
(2) Date: Jan. 23, 2023

(87) PCT Pub. No.: WO2022/019413
PCT Pub. Date: Jan. 27, 2022

(65) Prior Publication Data
US 2024/0036802 A1    Feb. 1, 2024

(51) Int. Cl.
*G06F 3/14* (2006.01)
*G09G 3/00* (2006.01)

(52) U.S. Cl.
CPC .............. *G06F 3/1454* (2013.01); *G09G 3/00* (2013.01); *G09G 2340/0492* (2013.01); *G09G 2370/04* (2013.01); *G09G 2370/16* (2013.01)

(58) Field of Classification Search
CPC .................... G06F 3/1454; G09G 3/00; G09G 2340/0492; G09G 2370/04; G09G 2370/16
See application file for complete search history.

(56) References Cited

U.S. PATENT DOCUMENTS

| | | | |
|---|---|---|---|
| 10,346,122 B1 * | 7/2019 | Morgan | G06F 3/0484 |
| 2013/0278484 A1 | 10/2013 | Hwang | |
| 2014/0358981 A1 * | 12/2014 | Miyake | G06F 3/1454 |
| | | | 709/201 |

(Continued)

FOREIGN PATENT DOCUMENTS

| | | |
|---|---|---|
| EP | 2808780 | 12/2014 |
| EP | 2880813 | 6/2015 |

(Continued)

OTHER PUBLICATIONS

PCT International Application No. PCT/KR2020/095088, International Search Report dated Apr. 8, 2021, 4 pages.

(Continued)

*Primary Examiner* — Ariel A Balaoing
(74) *Attorney, Agent, or Firm* — LEE, HONG, DEGERMAN, KANG & WAIMEY

(57) ABSTRACT

Provided is a display device comprising: a wireless communication unit connected to a user terminal; a display; and a processor which transmits screen mode data of the display to the user terminal by means of the wireless communication unit, receives, from the user terminal, output video data based on the screen mode data, and displays the received output video data on the display.

15 Claims, 17 Drawing Sheets

(56) References Cited

U.S. PATENT DOCUMENTS

| | | | |
|---|---|---|---|
| 2016/0253142 A1* | 9/2016 | Choi .................... | G06F 3/1423 |
| | | | 345/1.3 |
| 2016/0299683 A1 | 10/2016 | Kwon et al. | |
| 2017/0249919 A1* | 8/2017 | Bae .................... | H04N 1/00442 |
| 2017/0324794 A1* | 11/2017 | Jeong .................... | H04L 67/025 |
| 2018/0262801 A1* | 9/2018 | Park .................... | H04L 65/1094 |
| 2018/0295414 A1 | 10/2018 | Park et al. | |
| 2020/0036765 A1* | 1/2020 | Lee ........................ | H04L 67/12 |
| 2020/0341713 A1* | 10/2020 | Kambhatla ............ | G06T 3/4092 |
| 2021/0314520 A1* | 10/2021 | Yu .................... | H04N 21/4438 |

FOREIGN PATENT DOCUMENTS

| | | |
|---|---|---|
| KR | 20130119172 | 10/2013 |
| KR | 20150050883 | 5/2015 |
| KR | 20160120143 | 10/2016 |
| KR | 101744893 | 6/2017 |
| KR | 20190055802 | 5/2019 |
| WO | 2014022018 | 2/2014 |

OTHER PUBLICATIONS

European Patent Office Application Serial No. 20945743.1, Search Report dated Mar. 5, 2024, 4 pages.

Wi-Fi Alliance, "Wi-Fi Display Technical Specification, Version 2.1," XP055767970, Jul. 2017, 196 pages.

* cited by examiner

FIG. 11

| Field | Size(Octet) | Value |
|---|---|---|
| Generic input Type ID | 1 | Input type such as Zoom In, Scroll, etc. See Table 15 |
| Length | 2 | Length of the following fields in octets |
| Describe | Variable | The details of the user inputs |

(a)

| Generic Input Type ID | Notes |
|---|---|
| 0 | Left Mouse Down/Touch Down |
| 1 | Left Mouse Up/Touch Up |
| 2 | Mouse Move/Touch Move |
| 3 | Key Down |
| 4 | Key Up |
| 5 | Zoon |
| 6 | Vertical Scroll |
| 7 | Horizontal Scroll |
| 8 | Rotate |
| 9-255 | Reserved |

```
SET_PARAMETER rtsp://localhost/wfd1.0 RTSP/1.0
CSeq: x
Content-Type: text/parameters
Content-Length: xx wfd display rotation: vertical
```

(a)

```
SET_PARAMETER rtsp://localhost/wfd1.0 RTSP/1.0
CSeq: x
Content-Type: text/parameters
Content-Length: xx wfd display rotation: horizontal
```

(b)

DISPLAY DEVICE AND OPERATION METHOD THEREOF

CROSS-REFERENCE TO RELATED APPLICATIONS

This application is the National Stage filing under 35 U.S.C. 371 of International Application No. PCT/KR2020/095088, filed on Jul. 24, 2020, the contents of which are all incorporated by reference herein in their entirety.

TECHNICAL FIELD

The present disclosure relates to a display device and an operation method thereof, and more particularly, to a display device for receiving a portrait image from a connected user terminal and an operation method thereof.

BACKGROUND ART

A display device is a device having a function of receiving, processing, and displaying an image which a user is able to watch. The display device receives, for example, a broadcast signal selected by the user among broadcast signals transmitted from a broadcasting station, separates an image signal from the received signal, and displays the separated image signal on a display.

In addition, the display device may provide a screen mirroring function that outputs the screen of a user terminal as it is. Specifically, screen mirroring is for displaying an image being displayed on a small screen such as a smartphone or tablet on a large screen such as a TV, and the display device may output the screen of the user terminal as it is using data received from the user terminal.

Recently, various attempts have been made in viewing the display device, other than the conventional method, such as placing the display device in portrait orientation.

The method of viewing the display device in portrait orientation may be combined with a screen mirroring function to display a landscape image of the user terminal in landscape orientation and a portrait image of the user terminal in portrait orientation.

Meanwhile, when a conventional display device receives and outputs a portrait image from a user terminal, the display device re-edits and outputs the image received from the user terminal, resulting in deterioration in image quality.

DETAILED DESCRIPTION OF THE INVENTION

Technical Problem

The present disclosure provides a display device that receives an image in a manner that minimizes deterioration in image quality when the display device outputs a portrait image of a user terminal and an operation method thereof.

Technical Solution

According to an embodiment of the present disclosure, a display device may include a wireless communication interface that performs connection with a user terminal, a display, and a processor that transmits screen mode data of the display to the user terminal through the wireless communication interface, receives output image data based on the screen mode data from the user terminal, and displays the received output image data on the display.

The screen mode data may be landscape mode data indicating that the display is in a landscape mode or portrait mode data indicating that the display is in a portrait mode.

The processor may transmit the screen mode data to the user terminal using a user input back channel (UIBC) parameter.

The processor may transmit the screen mode data to the user terminal using a Real-Time Streaming Protocol (RTSP) parameter.

The output image data may be output image data for landscape mode or output image data for portrait mode.

The output image data for landscape mode may be image data including a practical image and a black image when the user terminal is in the portrait mode, and the output image data for portrait mode may be image data including no black image by rotating the practical image in landscape orientation when the user terminal is in the portrait mode.

According to an embodiment of the present disclosure, a method for operating a display device includes connecting to a user terminal, transmitting screen mode data of a display to the user terminal, receiving output image data based on the screen mode data from the user terminal, and displaying the output image data to the display.

The screen mode data may be landscape mode data indicating that the display is in a landscape mode or portrait mode data indicating that the display is in a portrait mode.

The transmitting of the screen mode data to the user terminal may include transmitting the screen mode data to the user terminal using a user input back channel (UIBC) parameter.

The transmitting of the screen mode data to the user terminal may include transmitting the screen mode data to the user terminal using a Real-Time Streaming Protocol (RTSP) parameter.

The output image data may be output image data for landscape mode or output image data for portrait mode.

The output image data for landscape mode may be image data including a practical image and a black image when the user terminal is in the portrait mode, and the output image data for portrait mode may be image data including no black image by rotating the practical image in landscape orientation when the user terminal is in the portrait mode.

According to an embodiment of the present disclosure, a user terminal may include a wireless communication interface that performs connection with a display device, a display, and a processor that receives screen mode data from the display device through the wireless communication interface, generates output image data to be transmitted to the display device based on the screen mode data, and transmits the generated output image data to the display device.

The processor may generate output image data for landscape mode when the screen mode data received from the display device is screen mode data indicating that the display device is in a landscape mode and generate output image data for portrait mode when the screen mode data is screen mode data indicating that the display device is in a portrait mode in a case where the user terminal is in a portrait mode.

Advantageous Effects of the Invention

The display device according to an embodiment of the present disclosure has an advantage of resolving degradation in picture quality when displaying a portrait image of a user terminal.

The display device according to an embodiment of the present disclosure has an advantage of increasing transmission efficiency of image data transmitted to and received from a user terminal.

DESCRIPTION OF THE DRAWINGS

FIG. 11 is a diagram illustrating an example of UIBC parameters transmitted and received between a display device and a user terminal according to an embodiment of the present disclosure.

FIG. 12 is a diagram illustrating an example of RTSP messages transmitted and received between a display device and a user terminal according to an embodiment of the present disclosure.

BEST MODE

Hereinafter, embodiments of the present disclosure will be described in detail with reference to the drawings. The suffixes "module" and "unit or portion" for components used in the following description are merely provided only for facilitation of preparing this specification, and thus they are not granted a specific meaning or function.

Figure 1:
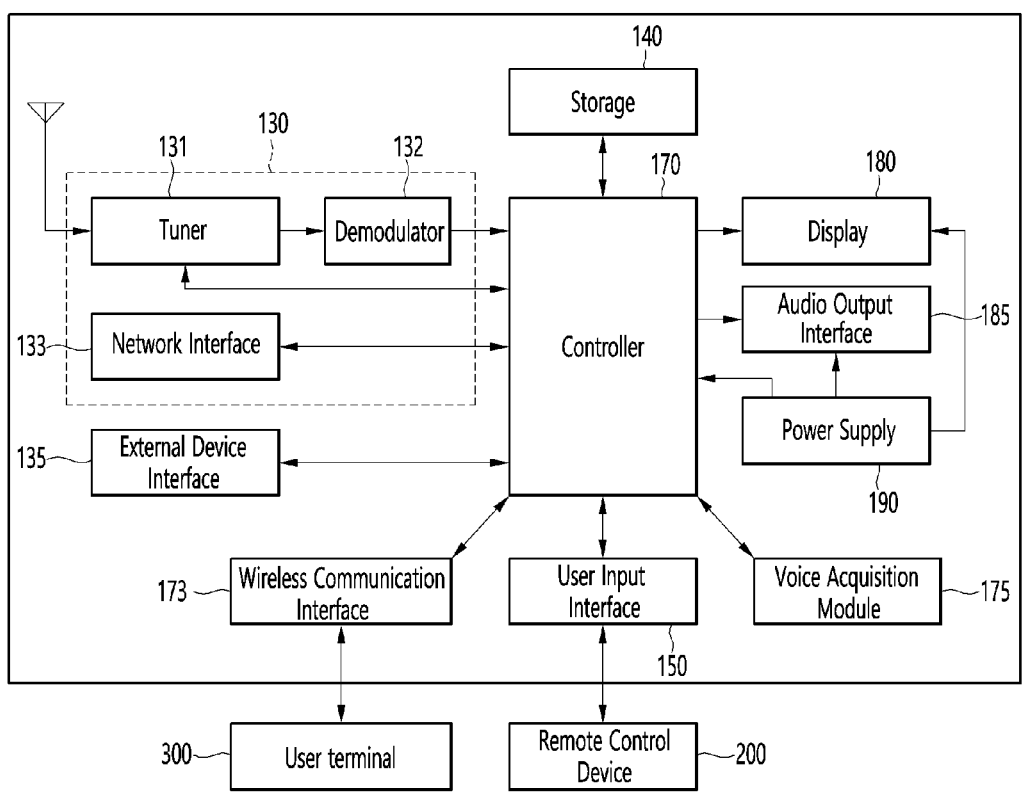
FIG. 1 is a block diagram showing a configuration of a display device according to an embodiment of the present disclosure.

FIG. 1 is a block diagram illustrating a configuration of a display device according to an embodiment of the present disclosure.

Referring to FIG. 1, a display device 100 can include a broadcast reception module 130, an external device interface 135, a storage 140, a user input interface 150, a controller 170, a wireless communication interface 173, a voice acquisition module 175, a display 180, an audio output interface 185, and a power supply 190.

The broadcast reception module 130 can include a tuner 131, a demodulator 132, and a network interface 133.

The tuner 131 can select a specific broadcast channel according to a channel selection command. The tuner 131 can receive broadcast signals for the selected specific broadcast channel.

The demodulator 132 can divide the received broadcast signals into video signals, audio signals, and broadcast program related data signals and restore the divided video signals, audio signals, and data signals to an output available form.

The network interface 133 can provide an interface for connecting the display device 100 to a wired/wireless network including internet network. The network interface 133 can transmit or receive data to or from another user or another electronic device through an accessed network or another network linked to the accessed network.

The network interface 133 can access a predetermined webpage through an accessed network or another network linked to the accessed network. That is, it can transmit or receive data to or from a corresponding server by accessing a predetermined webpage through network.

Then, the network interface 133 can receive contents or data provided from a content provider or a network operator. That is, the network interface 133 can receive contents such as movies, advertisements, games, VODs, and broadcast signals, which are provided from a content provider or a network provider, through network and information relating thereto.

Additionally, the network interface 133 can receive firmware update information and update files provided from a network operator and transmit data to an internet or content provider or a network operator.

The network interface 133 can select and receive a desired application among applications open to the air, through network.

The external device interface 135 can receive an application or an application list in an adjacent external device and deliver it to the controller 170 or the storage 140.

The external device interface 135 can provide a connection path between the display device 100 and an external device. The external device interface 135 can receive at least one of image and audio outputted from an external device that is wirelessly or wiredly connected to the display device 100 and deliver it to the controller. The external device interface 135 can include a plurality of external input terminals. The plurality of external input terminals can include an RGB terminal, at least one High Definition Multimedia Interface (HDMI) terminal, and a component terminal.

An image signal of an external device inputted through the external device interface 135 can be outputted through the display 180. A sound signal of an external device inputted through the external device interface 135 can be outputted through the audio output interface 185.

An external device connectable to the external device interface 135 can be one of a set-top box, a Blu-ray player, a DVD player, a game console, a sound bar, a smartphone, a PC, a USB Memory, and a home theater system but this is just exemplary.

Additionally, some content data stored in the display device 100 can be transmitted to a user or an electronic device, which is selected from other users or other electronic devices pre-registered in the display device 100.

The storage 140 can store signal-processed image, voice, or data signals stored by a program in order for each signal processing and control in the controller 170.

Additionally, the storage 140 can perform a function for temporarily store image, voice, or data signals outputted from the external device interface 135 or the network interface 133 and can store information on a predetermined image through a channel memory function.

The storage 140 can store an application or an application list inputted from the external device interface 135 or the network interface 133.

The display device 100 can play content files (for example, video files, still image files, music files, document files, application files, and so on) stored in the storage 140 and provide them to a user.

The user input interface 150 can deliver signals inputted from a user to the controller 170 or deliver signals from the controller 170 to a user. For example, the user input interface 150 can receive or process control signals such as power on/off, channel selection, and screen setting from the remote control device 200 or transmit control signals from the controller 170 to the remote control device 200 according to various communication methods such as Bluetooth, Ultra Wideband (WB), ZigBee, Radio Frequency (RF), and IR.

Additionally, the user input interface 150 can deliver, to the controller 170, control signals inputted from local keys (not shown) such as a power key, a channel key, a volume key, and a setting key.

Image signals that are image-processed in the controller 170 can be inputted to the display 180 and displayed as an image corresponding to corresponding image signals. Additionally, image signals that are image-processed in the controller 170 can be inputted to an external output device through the external device interface 135.

Voice signals processed in the controller 170 can be outputted to the audio output interface 185. Additionally, voice signals processed in the controller 170 can be inputted to an external output device through the external device interface 135.

Besides that, the controller 170 can control overall operations in the display device 100.

Additionally, the controller 170 can control the display device 100 by a user command or internal program inputted through the user input interface 150 and download a desired application or application list into the display device 100 in access to network.

The controller 170 can output channel information selected by a user together with processed image or voice signals through the display 180 or the audio output interface 185.

Additionally, according to an external device image playback command received through the user input interface 150, the controller 170 can output image signals or voice signals of an external device such as a camera or a camcorder, which are inputted through the external device interface 135, through the display 180 or the audio output interface 185.

Moreover, the controller 170 can control the display 180 to display images and control broadcast images inputted through the tuner 131, external input images inputted through the external device interface 135, images inputted through the network interface, or images stored in the storage 140 to be displayed on the display 180. In this case, an image displayed on the display 180 can be a still image or video and also can be a 2D image or a 3D image.

Additionally, the controller 170 can play content stored in the display device 100, received broadcast content, and external input content inputted from the outside, and the content can be in various formats such as broadcast images, external input images, audio files, still images, accessed web screens, and document files.

Moreover, the wireless communication interface 173 can perform a wired or wireless communication with an external electronic device. The wireless communication interface 173 can perform short-range communication with an external device. For this, the wireless communication interface 173 can support short-range communication by using at least one of Bluetooth™ Radio Frequency Identification (RFID), Infrared Data Association (IrDA), Ultra Wideband (UWB), ZigBee, Near Field Communication (NFC), Wireless-Fidelity (Wi-Fi), Wi-Fi Direct, and Wireless Universal Serial Bus (USB) technologies. The wireless communication interface 173 can support wireless communication between the display device 100 and a wireless communication system, between the display device 100 and another display device 100, or between networks including the display device 100 and another display device 100 (or an external server) through wireless area networks. The wireless area networks can be wireless personal area networks.

Herein, the other display device 100 can be a mobile terminal such as a wearable device (for example, a smart watch, a smart glass, and a head mounted display (HMD)) or a smartphone, which is capable of exchanging data (or inter-working) with the display device 100. The wireless communication interface 173 can detect (or recognize) a communicable wearable device around the display device 100. Furthermore, if the detected wearable device is a device authenticated to communicate with the display device 100, the controller 170 can transmit at least part of data processed in the display device 100 to the wearable device through the wireless communication interface 173. Accordingly, a user of the wearable device can use the data processed in the display device 100 through the wearable device.

An external device that communicates with the display device 100 through the wireless communication interface 173 may include a user terminal 300. In this case, the user terminal 300 may include a wireless communication interface (not shown) that communicates with the display device, a processor (not shown) that performs overall control of the user terminal 300, a display (not shown), and the like.

The voice acquisition module 175 can acquire audio. The voice acquisition module 175 may include at least one microphone (not shown), and can acquire audio around the display device 100 through the microphone (not shown).

The display 180 can convert image signals, data signals, or OSD signals, which are processed in the controller 170, or images signals or data signals, which are received in the external device interface 135, into R, G, and B signals to generate driving signals.

Furthermore, the display device 100 shown in FIG. 1 is just one embodiment of the present disclosure and thus, some of the components shown can be integrated, added, or omitted according to the specification of the actually implemented display device 100.

That is, if necessary, two or more components can be integrated into one component or one component can be divided into two or more components and configured. Additionally, a function performed by each block is to describe an embodiment of the present disclosure and its specific operation or device does not limit the scope of the present disclosure.

According to another embodiment of the present disclosure, unlike FIG. 1, the display device 100 can receive images through the network interface 133 or the external device interface 135 and play them without including the tuner 131 and the demodulator 132.

For example, the display device 100 can be divided into an image processing device such as a set-top box for receiving broadcast signals or contents according to various network services and a content playback device for playing contents inputted from the image processing device.

In this case, an operation method of a display device according to an embodiment of the present disclosure described below can be performed by one of the display device described with reference to FIG. 1, an image processing device such as the separated set-top box, and a content playback device including the display 180 and the audio output interface 185.

The audio output interface 185 receives the audio processed signal from the controller 170 and outputs the sound.

The power supply 190 supplies the corresponding power throughout the display device 100. In particular, the power supply 190 supplies power to the controller 170 that can be implemented in the form of a System On Chip (SOC), a display 180 for displaying an image, and the audio output interface 185 for outputting audio or the like.

Specifically, the power supply 190 may include a converter for converting an AC power source into a DC power source, and a DC/DC converter for converting a level of the DC source power.

Figure 2:
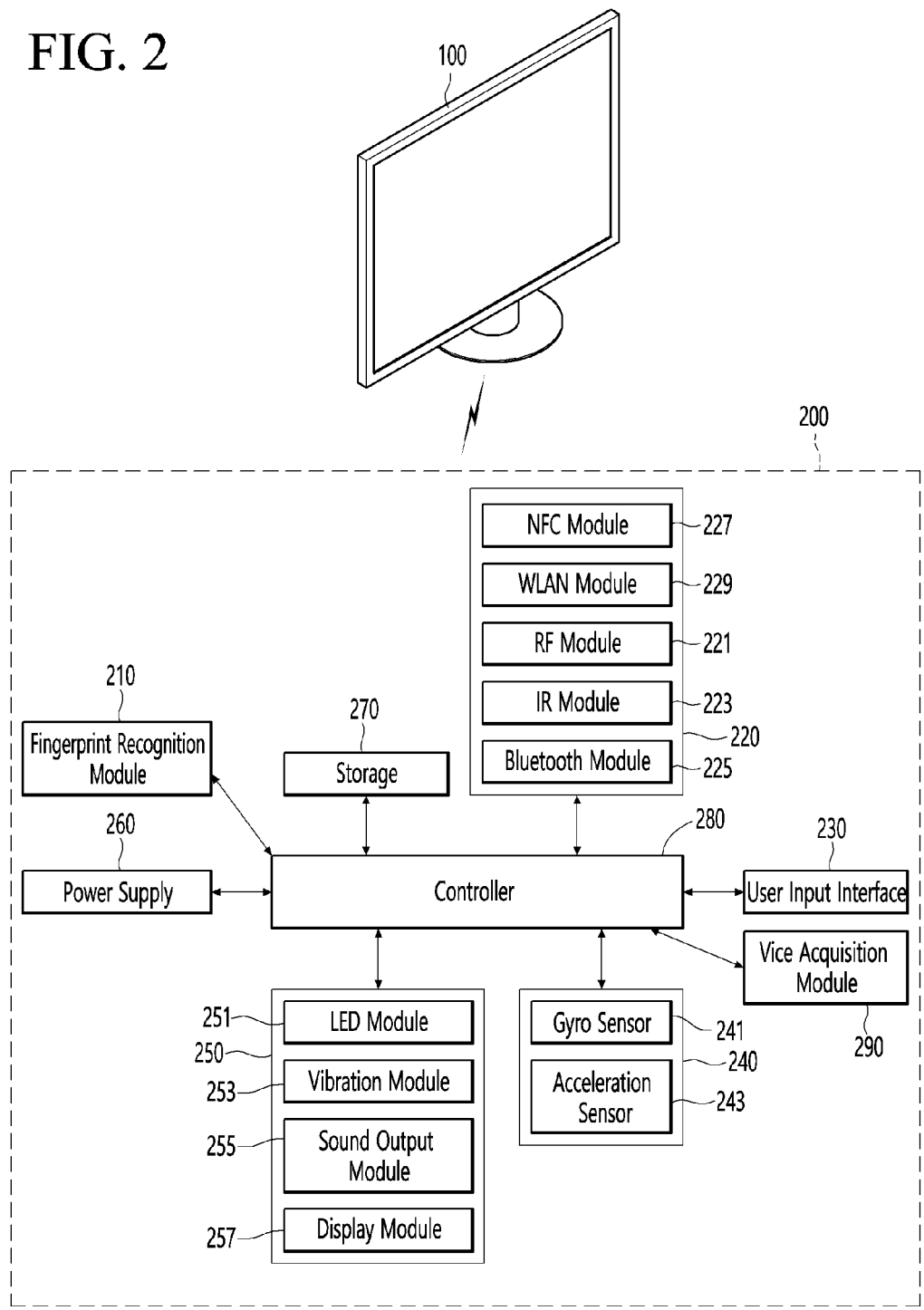
FIG. 2 is a block diagram of a remote control device according to an embodiment of the present disclosure.
Figure 3:
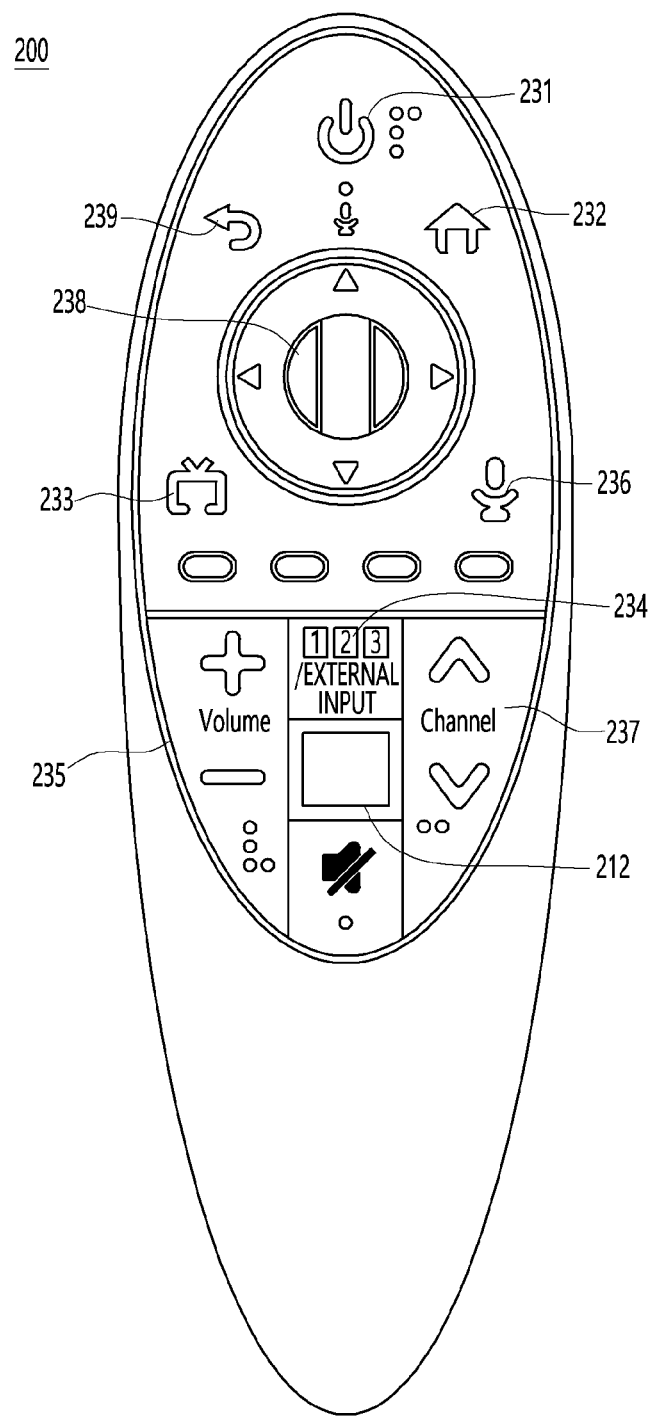
FIG. 3 shows an actual configuration example of a remote control device according to an embodiment of the present disclosure.

Then, referring to FIGS. 2 and 3, a remote control device is described according to an embodiment of the present disclosure.

FIG. 2 is a block diagram illustrating a remote control device according to an embodiment of the present disclosure and FIG. 3 is a view illustrating an actual configuration of a remote control device according to an embodiment of the present disclosure.

First, referring to FIG. 2, a remote control device 200 can include a fingerprint recognition module 210, a wireless communication interface 220, a user input interface 230, a sensor 240, an output interface 250, a power supply 260, a storage 270, a controller 280, and a voice acquisition module 290.

Referring to FIG. 2, the wireless communication interface 220 transmits/receives signals to/from an arbitrary any one of display devices according to the above-mentioned embodiments of the present disclosure.

The remote control device 200 can include an RF module 221 for transmitting/receiving signals to/from the display device 100 according to the RF communication standards and an IR module 223 for transmitting/receiving signals to/from the display device 100 according to the IR communication standards. Additionally, the remote control device 200 can include a Bluetooth module 225 for transmitting/receiving signals to/from the display device 100 according to the Bluetooth communication standards. Additionally, the remote control device 200 can include an NFC module 227 for transmitting/receiving signals to/from the display device 100 according to the Near Field Communication (NFC) communication standards and a WLAN module 229 for transmitting/receiving signals to/from the display device 100 according to the Wireless LAN (WLAN) communication standards.

Additionally, the remote control device 200 can transmit signals containing information on a movement of the remote control device 200 to the display device 100 through the wireless communication interface 220.

Moreover, the remote control device 200 can receive signals transmitted from the display device 100 through the RF module 221 and if necessary, can transmit a command on power on/off, channel change, and volume change to the display device 100 through the IR module 223.

The user input interface 230 can be configured with a keypad button, a touch pad, or a touch screen. A user can manipulate the user input interface 230 to input a command relating to the display device 100 to the remote control device 200. If the user input interface 230 includes a hard key button, a user can input a command relating to the display device 100 to the remote control device 200 through the push operation of the hard key button. This will be described with reference to FIG. 3.

Referring to FIG. 3, the remote control device 200 can include a plurality of buttons. The plurality of buttons can include a fingerprint recognition button 212, a power button 231, a home button 232, a live button 233, an external input button 234, a voice adjustment button 235, a voice recognition button 236, a channel change button 237, an OK button 238, and a back button 239.

The fingerprint recognition button 212 can be a button for recognizing a user's fingerprint. According to an embodiment of the present disclosure, the fingerprint recognition button 212 can perform a push operation and receive a push operation and a fingerprint recognition operation. The power button 231 can be button for turning on/off the power of the display device 100. The power button 231 can be button for moving to the home screen of the display device 100. The live button 233 can be a button for displaying live broadcast programs. The external input button 234 can be button for receiving an external input connected to the display device 100. The voice adjustment button 235 can be button for adjusting the size of a volume outputted from the display device 100. The voice recognition button 236 can be a button for receiving user's voice and recognizing the received voice. The channel change button 237 can be a button for receiving broadcast signals of a specific broadcast channel. The OK button 238 can be a button for selecting a specific function and the back button 239 can be a button for returning to a previous screen.

Again, FIG. 2 is described.

If the user input interface 230 includes a touch screen, a user can touch a soft key of the touch screen to input a command relating to the display device 100 to the remote control device 200. Additionally, the user input interface 230 can include various kinds of input means manipulated by a user, for example, a scroll key and a jog key, and this embodiment does not limit the scope of the present disclosure.

The sensor 240 can include a gyro sensor 241 or an acceleration sensor 243 and the gyro sensor 241 can sense information on a movement of the remote control device 200.

For example, the gyro sensor 241 can sense information on an operation of the remote control device 200 on the basis of x, y, and z axes and the acceleration sensor 243 can sense information on a movement speed of the remote control device 200. Moreover, the remote control device 200 can further include a distance measurement sensor and sense a distance with respect to the display 180 of the display device 100.

The output interface 250 can output image or voice signals corresponding to a manipulation of the user input interface 230 or corresponding to signals transmitted from the display device 100. A user can recognize whether the user input interface 230 is manipulated or the display device 100 is controlled through the output interface 250.

For example, the output interface 250 can include an LED module 251 for flashing, a vibration module 253 for generating vibration, a sound output module 255 for outputting sound, or a display module 257 for outputting an image, if the user input interface 230 is manipulated or signals are transmitted/received to/from the display device 100 through the wireless communication interface 220.

Additionally, the power supply 260 supplies power to the remote control device 200 and if the remote control device 200 does not move for a predetermined time, stops the power supply, so that power waste can be reduced. The power supply 260 can resume the power supply if a predetermined key provided at the remote control device 200 is manipulated.

The storage 270 can store various kinds of programs and application data necessary for a control or operation of the remote control device 200. If the remote control device 200 transmits/receives signals wirelessly through the display device 100 and the RF module 221, the remote control device 200 and the display device 100 transmits/receives signals through a predetermined frequency band.

The controller 280 of the remote control device 200 can store, in the storage 270, information on a frequency band for transmitting/receiving signals to/from the display device 100 paired with the remote control device 200 and refer to it.

The storage 270 may be referred to as a memory 270.

The controller 280 controls general matters relating to a control of the remote control device 200. The controller 280 can transmit a signal corresponding to a predetermined key manipulation of the user input interface 230 or a signal corresponding to a movement of the remote control device 200 sensed by the sensor 240 to the display device 100 through the wireless communication interface 220.

The controller 280 may be referred to as a processor 280.

Additionally, the voice acquisition module 290 of the remote control device 200 can obtain voice.

The voice acquisition module 290 can include at least one microphone 291 and obtain voice through the microphone 291.

Figure 4:
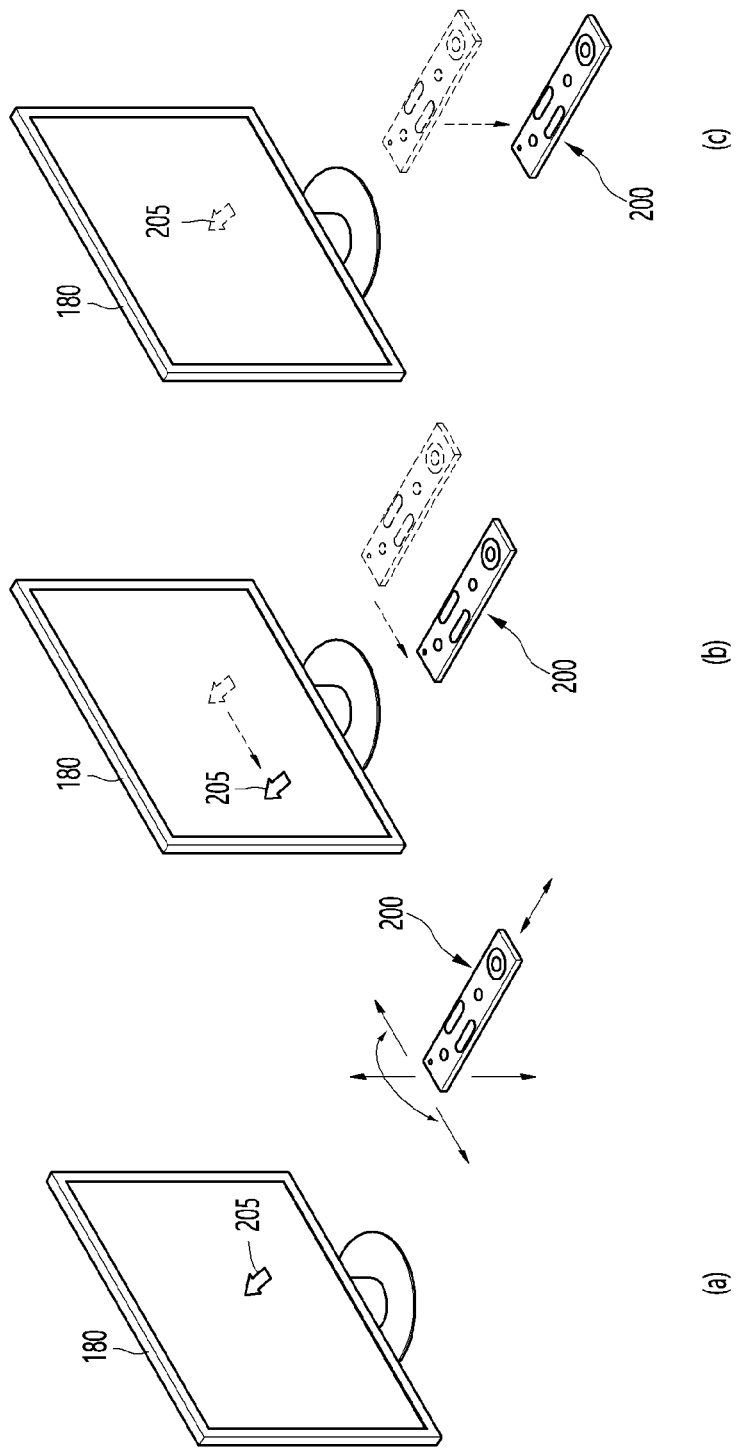
FIG. 4 shows an example of using a remote control device according to an embodiment of the present disclosure.

Then, FIG. 4 is described.

FIG. 4 is a view of utilizing a remote control device according to an embodiment of the present disclosure.

FIG. 4A illustrates that a pointer 205 corresponding to the remote control device 200 is displayed on the display 180.

A user can move or rotate the remote control device 200 vertically or horizontally. The pointer 205 displayed on the display 180 of the display device 100 corresponds to a movement of the remote control device 200. Since the corresponding pointer 205 is moved and displayed according to a movement on a 3D space as show in the drawing, the remote control device 200 can be referred to as a spatial remote controller.

FIG. 4B illustrates that if a user moves the remote control device 200, the pointer 205 displayed on the display 180 of the display device 100 is moved to the left in correspondence thereto.

Information on a movement of the remote control device 200 detected through a sensor of the remote control device 200 is transmitted to the display device 100. The display device 100 can calculate the coordinates of the pointer 205 from the information on the movement of the remote control device 200. The display device 100 can display the pointer 205 to match the calculated coordinates.

FIG. 4C illustrates that while a specific button in the remote control device 200 is pressed, a user moves the remote control device 200 away from the display 180. Thus, a selection area in the display 180 corresponding to the pointer 205 can be zoomed in and displayed largely.

On the other hand, if a user moves the remote control device 200 close to the display 180, a selection area in the display 180 corresponding to the pointer 205 can be zoomed out and displayed reduced.

On the other hand, if the remote control device 200 is away from the display 180, a selection area can be zoomed out and if the remote control device 200 is close to the display 180, a selection area can be zoomed in.

Additionally, if a specific button in the remote control device 200 is pressed, the recognition of a vertical or horizontal movement can be excluded. That is, if the remote control device 200 is moved away from or close to the display 180, the up, down, left, or right movement cannot be recognized and only the back and forth movement can be recognized. While a specific button in the remote control device 200 is not pressed, only the pointer 205 is moved according to the up, down, left or right movement of the remote control device 200.

Moreover, the moving speed or moving direction of the pointer 205 can correspond to the moving speed or moving direction of the remote control device 200.

Furthermore, a pointer in this specification means an object displayed on the display 180 in correspondence to an operation of the remote control device 200. Accordingly, besides an arrow form displayed as the pointer 205 in the drawing, various forms of objects are possible. For example, the above concept includes a point, a cursor, a prompt, and a thick outline. Then, the pointer 205 can be displayed in correspondence to one point of a horizontal axis and a vertical axis on the display 180 and also can be displayed in correspondence to a plurality of points such as a line and a surface.

In addition, the display 180 may display the screen of a user terminal connected to the display device 100, and this function may be referred to as screen mirroring or screen casting. The screen mirroring may include Miracast. The user terminal may include all devices capable of being wirelessly connected to the display device 100. For example, the user terminal may include a smartphone, a laptop computer, a tablet, a PC, and the like.

Although a description is given in this specification under assumption that a smartphone is connected to the display device 100 as the user terminal 300 (see FIG. 5), this is only an example for convenience of description, and various external devices may be connected to the display device 100 in addition to the smartphone.

Next, referring to FIGS. 5 and 6, a method of providing a mirroring function in a landscape mode and a portrait mode in the display device 100 according to an embodiment of the present disclosure will be described.

Figure 5:
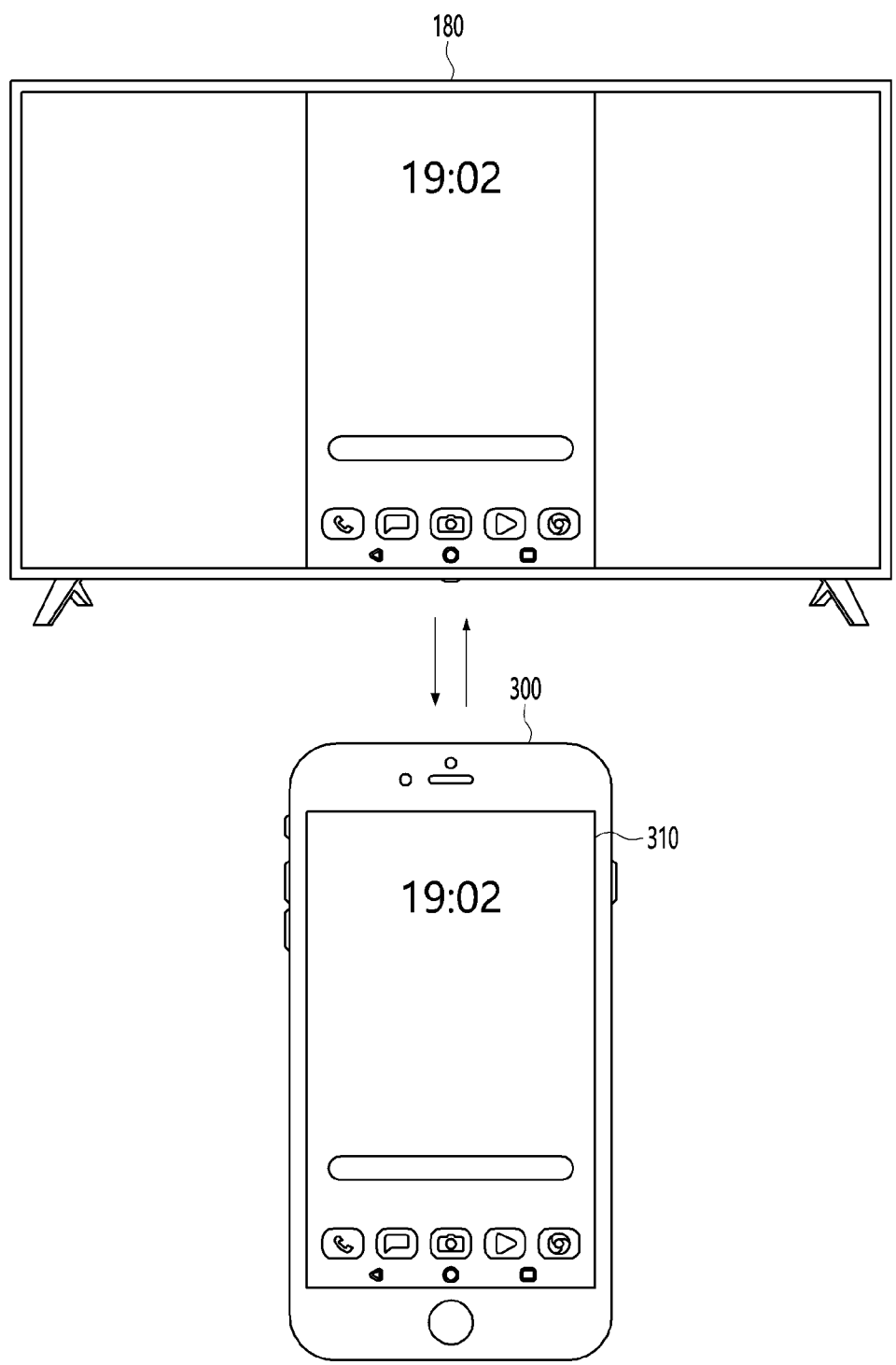
FIG. 5 is a diagram showing an example of a screen of a display device according to an embodiment of the present disclosure when the display device mirrors a screen of a user terminal in a landscape mode.
Figure 6:
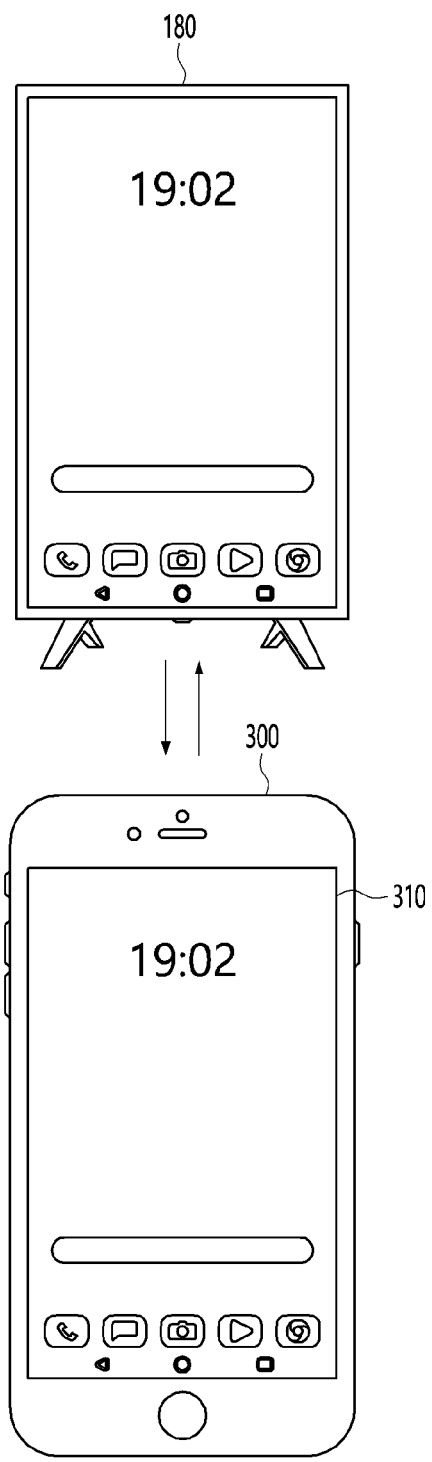
FIG. 6 is a diagram showing an example of a screen of a display device according to an embodiment of the present disclosure when the display device mirrors a screen of a user terminal in a portrait mode.

FIG. 5 is a diagram showing an example of a screen of a display device according to an embodiment of the present disclosure when the display device mirrors a screen of a user terminal in a landscape mode, and FIG. 6 is a diagram showing an example of a screen of a display device according to an embodiment of the present disclosure when the display device mirrors a screen of a user terminal in a portrait mode.

The screen mode of the display device 100 may include a landscape mode and a portrait mode. As shown in FIG. 5, the landscape mode of the display device 100 may be a mode in which the long side of the display 180 is in the horizontal direction and the short side is in the vertical direction. As shown in FIG. 6, the portrait mode of the display device 100 may be a mode in which the short side of the display 180 is in the horizontal direction and the long side is in the vertical direction.

The screen mode of the user terminal 300 may also include a landscape mode and a portrait mode. The landscape mode of the user terminal 300 may be a mode in which the long side of the display unit 310 is in the horizontal direction and the short side is in the vertical direction. The portrait mode of the user terminal 300 may be a mode in which the short side of the display 310 is in the horizontal direction and the long side is in the vertical direction.

The display device 100 may be wirelessly connected to the user terminal 300 and allow the display 180 to receive and display an image being displayed on the screen 310 of the user terminal 300.

Also, since the display device 100 and the user terminal 300 are wirelessly connected to each other, the user may control the user terminal 300 using the screen of the user terminal being displayed on the display 180.

The display device 100 may receive image data and coordinate mapping data from the user terminal 300 through the wireless communication interface 173.

The display device 100 may transmit the coordinate mapping data to the user terminal 300 through the wireless communication interface 173.

The image data may be data related to an image being displayed on the screen 310 of the user terminal 300.

When the coordinate systems used by the display device 100 and the user terminal 300 connected to each other are different as the display device 100 and the user terminal 300 rotate from landscape orientation to portrait orientation or from portrait orientation to landscape orientation, individually, the coordinate mapping data may refer to information about coordinate systems exchanged with each other. A detailed description will be given with reference to FIG. 17 later.

The image data received from the user terminal 300 may include landscape image data and portrait image data.

The landscape image data may refer to image data which the display device 100 receives from the user terminal 300 when the user terminal 300 is in a landscape mode, and the portrait image data may refer to image data which the display device 100 receives from the user terminal 300 when the user terminal 300 is in a portrait mode.

The portrait image data may include portrait image data for the landscape mode and portrait image data for the vertical mode, which will be described later with reference to FIGS. 7 and 8.

Next, the portrait image data that the display device 100 according to an embodiment of the present disclosure is able to receive from the user terminal 300 will be described with reference to FIGS. 7 to 8.

Figure 7:
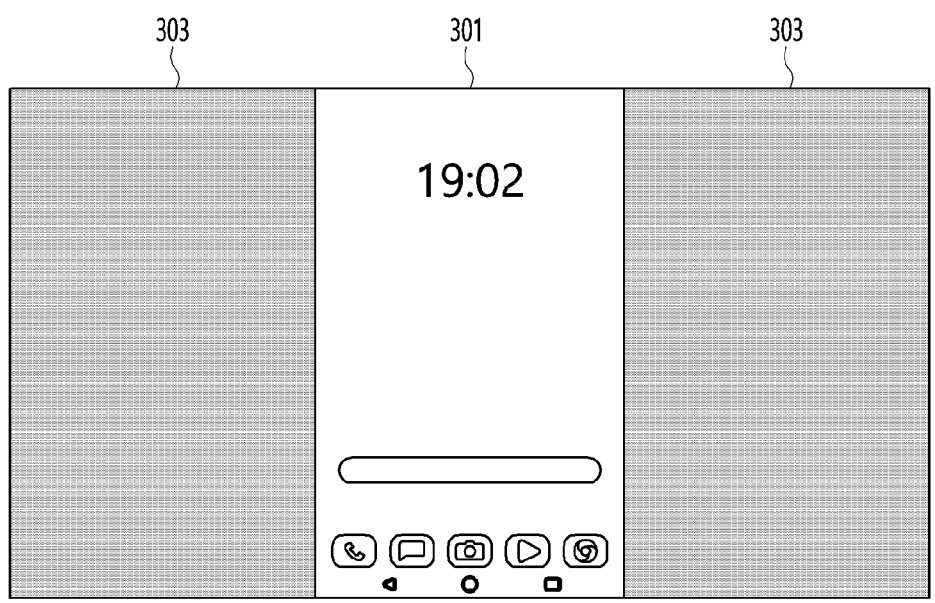
FIG. 7 is a diagram illustrating an example of portrait image data that a display device according to the present disclosure is able to receive from a user terminal.
Figure 8:
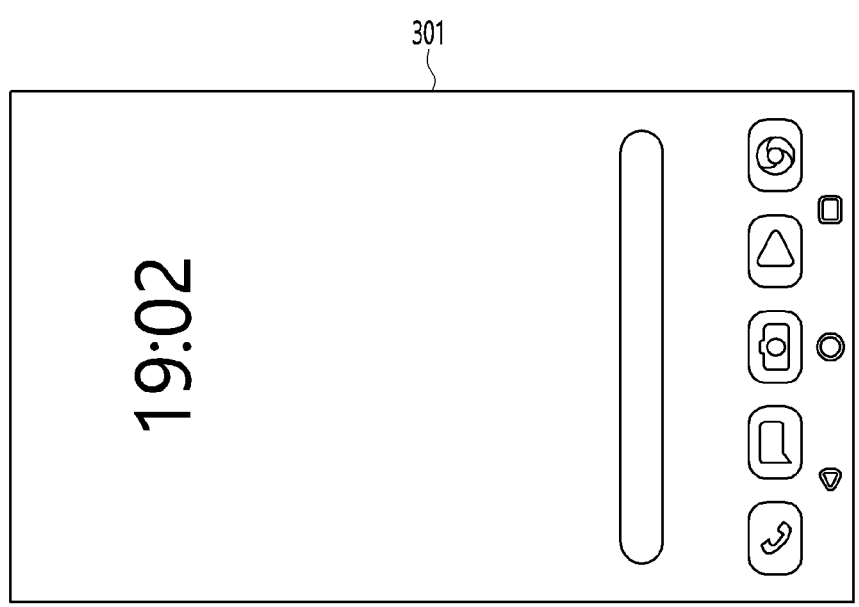
FIG. 8 is a diagram illustrating another example of portrait image data that a display device according to the present disclosure is able to receive from a user terminal.

FIG. 7 is a diagram illustrating an example of portrait image data that a display device according to the present disclosure is able to receive from a user terminal, and FIG. 8 is a diagram illustrating another example of portrait image data that a display device according to the present disclosure is able to receive from a user terminal.

The portrait image data received from the user terminal 300 may include portrait image data for the landscape mode and portrait image data for the portrait mode. The portrait image data for the landscape mode may be data including a practical image 301 and a black image 303 around the practical image 301 as shown in FIG. 7, and the portrait image data for the portrait mode may be data obtained by rotating the practical image 301 in landscape orientation as shown in FIG. 8 to include no black image 303.

Even when the screen mode is changed in portrait orientation, the conventional display device 100 necessarily receives portrait image data for landscape mode as shown in FIG. 7 and expand and display the portrait image data to be fit to the size of the display 180, causing a problem in that the quality of the image displayed in the display 180 is degraded.

In addition, the ratio of the capacity of a practically displayed image to the capacity of image data to be transmitted and received between the display device 100 and the user terminal 300 is small, resulting in low data transmission efficiency.

Accordingly, the user terminal 300 connected to the display device 100 according to an embodiment of the present disclosure may transmit portrait image data for portrait mode including no black image to the display device 100 as shown in FIG. 8.

That is, the display device 100 according to an embodiment of the present disclosure may receive the portrait image data for portrait mode that does not include a black image from the user terminal 300.

Meanwhile, since the conventional display device 100 and the user terminal 300 cannot exchange information about the screen mode of the display device 100, that is, information about whether the display device 100 is in landscape mode or portrait mode, the user terminal 300 may not determine whether to transmit portrait image data for landscape mode or portrait image data for portrait mode.

To this end, the display device 100 according to an embodiment of the present disclosure may transmit screen mode data of the display device 100 to the user terminal 300 and receive and display output image data suitable for the screen mode from the user terminal 300.

Next, a method of transmitting screen mode data of the display 180 to the user terminal 300, and receiving and displaying output image data suitable for the screen mode of the display 180 from the user terminal 300 in the display device 100 according to an embodiment of the present disclosure will be described with reference to FIG. 9.

Figure 9:
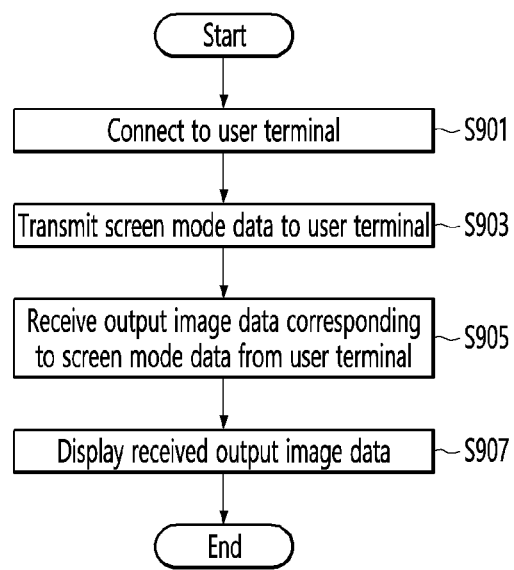
FIG. 9 is a flowchart for describing an operation method of a display device according to an embodiment of the present disclosure.

FIG. 9 is a flowchart for describing an operation method of a display device according to an embodiment of the present disclosure.

The display device 100 may be connected to the user terminal 300 (S901). The display device 100 may be connected to the user terminal 300 through the wireless communication interface 173.

The display device 100 may transmit screen mode data to the user terminal 300 (S903).

The controller 170 may transmit screen mode data to the user terminal 300 through the wireless communication interface 173.

The screen mode data may include landscape mode data indicating that the display 180 of the display device 100 is in a landscape mode and portrait mode data indicating that the display 180 is in a portrait mode.

The controller 170 may transmit the screen mode data to the user terminal 300 using a UIBC parameter or an RTSP parameter, which will be described in detail with reference to FIGS. 10 to 12.

The display device 100 may transmit the screen mode data to the user terminal 300 (S903) and receive output image data corresponding to the screen mode data from the user terminal 300 (S905).

The output image data corresponding to screen mode data may include output image data for landscape mode and output image data for portrait mode.

The output image data for the landscape mode may refer to image data suitable when the display device 100 is in the landscape mode. The output image data for landscape mode may refer to image data that transmits a screen being displayed on the user terminal 300 as it is. For example, when the user terminal 300 is in landscape mode, the output image data may be image data that transmits a screen being displayed on the user terminal 300 as it is. Also, when the user terminal 300 is in portrait mode, the output image data may be portrait image data for landscape mode including a practical image 301 and a black image 303 as shown in FIG. 7.

The output image data for the portrait mode may refer to image data suitable when the display device 100 is in the portrait mode. The output image data for portrait mode may refer to image data transmitted after rotating a screen being displayed in the user terminal 300. For example, when the user terminal 300 is in a landscape mode, the output image data may be image data that transmits a screen being displayed on the user terminal 300 after rotating the screen. Also, when the user terminal 300 is in portrait mode, the output image data may be portrait image data for portrait mode that does not include a black image by rotating a practical image, as shown in FIG. 8.

The display device 100 may display the received output image data on the display 180 (S907).

The controller 170 may allow the display 180 to display output the image data received from the user terminal 300 through the wireless communication interface 173.

The controller 170 may store the output image data received from the user terminal 300 in a buffer, render the image data stored in the buffer, and display the same image as the image being displayed on the user terminal 300 on the display 180.

Next, a method of transmitting screen mode data to the user terminal 300 using a UIBC parameter or an RTSP parameter in the display device 100 according to an embodiment of the present disclosure will be described with reference to FIGS. 10 to 12.

Figure 10:
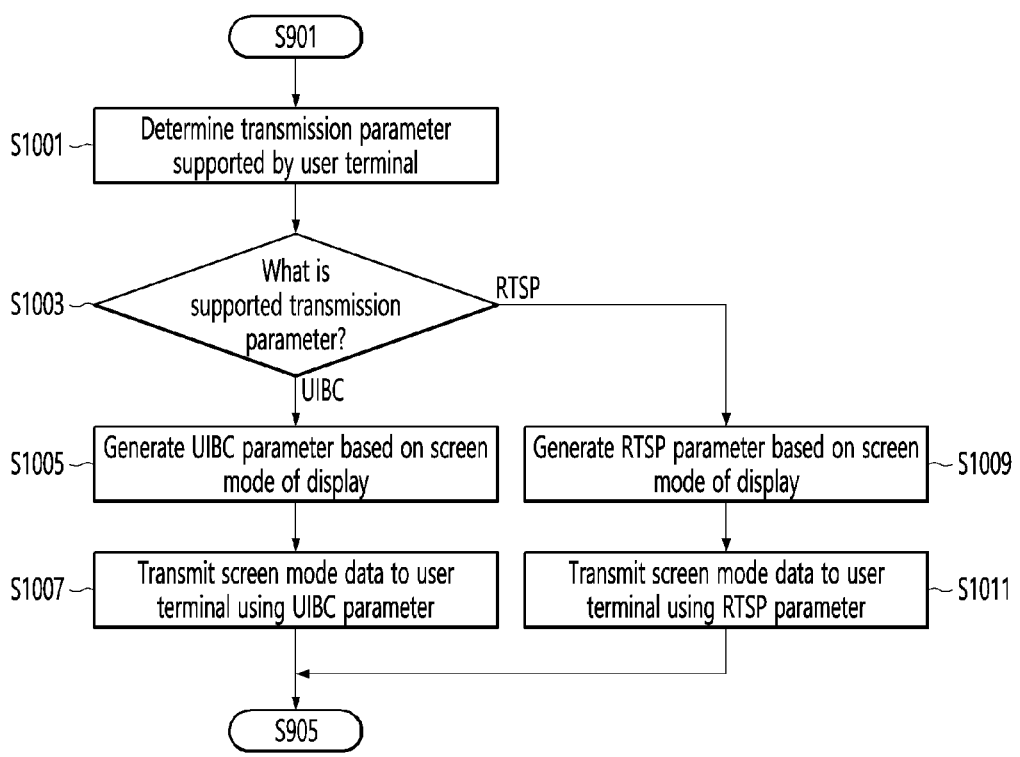
FIG. 10 is an operation flowchart illustrating an example of an operation of transmitting screen mode data to a user terminal shown in FIG. 9.

FIG. 10 is an operation flowchart illustrating an example of an operation of transmitting screen mode data to a user terminal shown in FIG. 9 (S903).

The controller 170 may determine a transmission parameter supported by the user terminal 300 (S1001).

The transmission parameter supported by the user terminal 300 may mean communication data according to the Wi-Fi Display (WFD) standard. The transmission parameter supported by the user terminal 300 may include a User Input Back Channel (UIBC) parameter and a Real-Time Streaming Protocol (RTSP) parameter.

When the transmission parameter supported by the user terminal 300 is determined to be UIBC (S1003), the controller 170 may generate a UIBC parameter based on the screen mode of the display 180 (S1005).

The controller 170 may transmit screen mode data to the user terminal 300 using the UIBC parameter generated based on the screen mode of the display 180 (S1007).

Operations S1005 and S1007 in which the controller 170 generates the UIBC parameter based on the screen mode and transmits the screen mode data will be described later in detail with reference to FIG. 11.

When the transmission parameter supported by the user terminal 300 is determined to be RTSP (S1003), the controller 170 may generate a RTSP parameter based on the screen mode of the display 180 (S1009).

The controller 170 may transmit screen mode data to the user terminal 300 using the RTSP parameter generated based on the screen mode of the display 180 (S1011).

Operations S1009 and S1011 in which the controller 170 generates the RTSP parameter based on the screen mode and transmits the screen mode data will be described later in detail with reference to FIG. 12.

FIG. 11 is a diagram illustrating an example of UIBC parameters transmitted and received between a display device and a user terminal according to an embodiment of the present disclosure.

FIG. 11(a) and FIG. 11(b) are diagrams illustrating formats of a UIBC message when the UIBC parameter is a generic type.

When the Generic Input Type ID of the UIBC is set to 8 (rotate) and transmitted to the user terminal 300, the controller 170 may transmit information on the screen mode of the display 180. For example, the controller 170 may set the Generic Input Type ID of the UIBC parameter transmitted to the user terminal 300 to 8 (rotate), and transmit, to Describe, screen mode data indicating that the screen mode of the display 180 is a landscape mode. On the other hand, the controller 170 may set the Generic Input Type ID of the UIBC parameter transmitted to the user terminal 300 to 8 (rotate), and transmit, to Describe, screen mode data indicating that the screen mode of the display 180 is a portrait mode.

That is, the controller 170 may generate a UIBC parameter based on the screen mode of the display 180 and transmit screen mode data.

FIG. 12 is a diagram illustrating an example of RTSP messages transmitted and received between a display device and a user terminal according to an embodiment of the present disclosure.

The control unit 170 may include information on the screen mode of the display 180 in an RTSP parameter to be transmitted to the user terminal 300 and transmit the RTSP parameter. For example, as shown in (a) of FIG. 12, the controller 170 may insert message "wfd_display_rotation horizontal" into the RTSP parameter to be transmitted to the user terminal 300 and generate and transmit screen mode data indicating that the screen mode of the display 180 is a landscape mode. On the other hand, as shown in (b) of FIG. 12, the controller 170 may insert message "wfd_display_rotation vertical" into the RTSP parameter to be transmitted to the user terminal 300 and generate and transmit screen mode data indicating that the screen mode of the display 180 is a portrait mode. This is merely an example, and the controller 170 may include the screen mode data of the display 180 in data transmitted or received to and from the user terminal 300 in various other methods and perform transmission.

Next, an operation method of the user terminal 300 connected to the display device 100 according to an embodiment of the present disclosure will be described with reference to FIG. 13.

Figure 13:
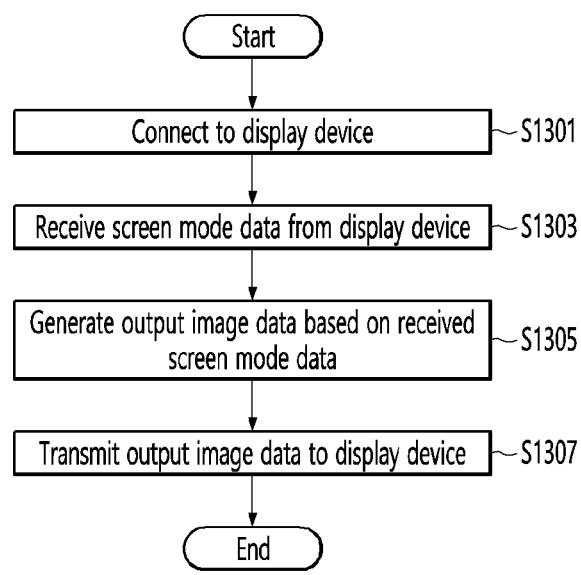
FIG. 13 is a flowchart for describing an operation method of a user terminal according to an embodiment of the present disclosure.

FIG. 13 is a flowchart for describing an operation method of a user terminal according to an embodiment of the present disclosure.

The user terminal 300 may be connected to the display device 100 (S1301).

The user terminal 300 may be connected to the display device 100 through a wireless communication interface (not shown).

The user terminal 300 may receive screen mode data from the display device (S1303).

The user terminal 300 may receive landscape mode data indicating that the display device 100 is in a landscape mode or portrait mode data indicating that the the display device is in a portrait mode from the display device.

The user terminal 300 may receive screen mode data including landscape mode data or portrait mode data using the aforementioned UIBC parameter or RTSP parameter.

The user terminal 300 may generate output image data based on the received screen mode data (S1305).

When the received screen mode data is landscape mode data indicating that the display device 100 is in landscape mode, a processor (not shown) of the user terminal 300 may generate output image data for landscape mode as output image data, and when the received screen mode data is portrait mode data indicating that the display device 100 is in portrait mode, a processor (not shown) of the user terminal 300 may generate output image data for portrait mode as output image data.

The output image data may include output image data suitable for landscape mode when the display device 100 is in landscape mode and output image data suitable for portrait mode when the display device 100 is in portrait mode.

The output image data for landscape mode may refer to image data that transmits a screen being displayed on the user terminal 300 as it is. For example, when the user terminal 300 is in landscape mode, the output image data may be image data that transmits a screen being displayed on the user terminal 300 as it is. Also, when the user terminal 300 is in portrait mode, the output image data may be portrait image data for landscape mode including a practical image 301 and a black image 303 as shown in FIG. 7.

The output image data for portrait mode may refer to image data transmitted after rotating a screen being displayed in the user terminal 300. For example, when the user terminal 300 is in a landscape mode, the output image data may be image data that transmits a screen being displayed on the user terminal 300 after rotating the screen. Also, when the user terminal 300 is in portrait mode, the output image data may be portrait image data for portrait mode that does not include a black image by rotating a practical image, as shown in FIG. 8.

The mobile terminal 300 may transmit the generated output image data to the display device 100 (S1307).

Figure 14:
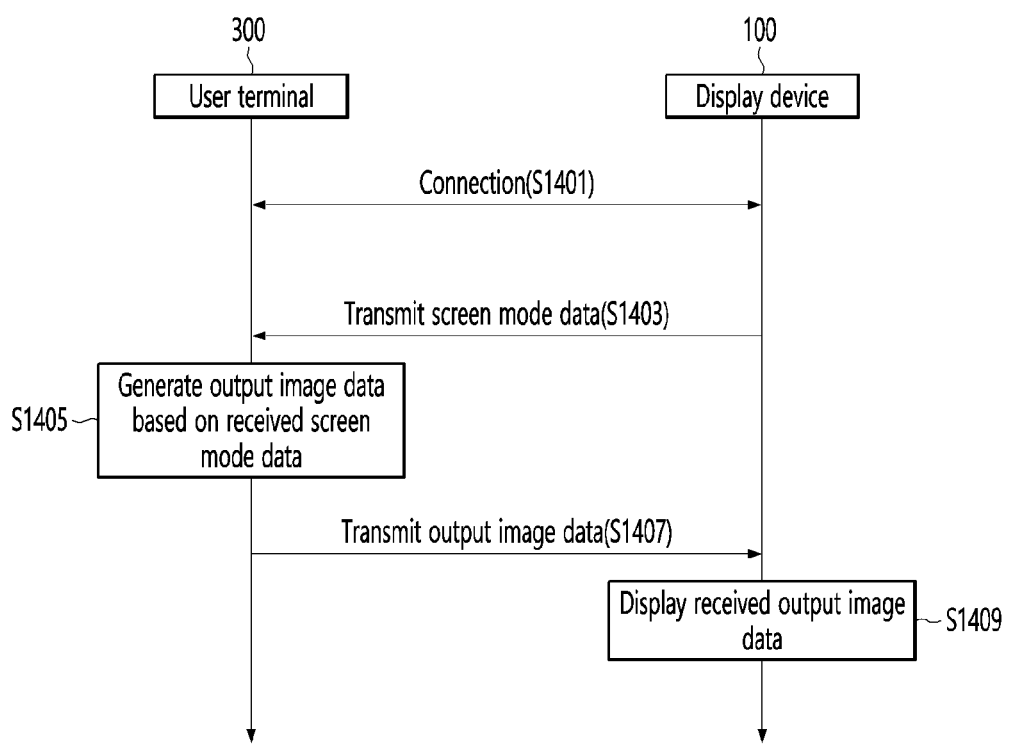
FIG. 14 is a ladder diagram illustrating a method of operating a display device and a user terminal according to an embodiment of the present disclosure.

FIG. 14 is a ladder diagram illustrating a method of operating a display device and a user terminal according to an embodiment of the present disclosure.

The display device 100 and the user terminal 300 may be connected to each other (S1401). The display device 100 may be connected to the user terminal 300 through the wireless communication interface 173.

The display device 100 may transmit screen mode data to the user terminal 300 (S1403).

The screen mode data may be landscape mode data indicating that the display 180 of the display device 100 is in a landscape mode or portrait mode data indicating that the display 180 is in a portrait mode.

The user terminal 300 may generate output image data based on the received screen mode data (S1405).

The output image data may be output image data for landscape mode and output image data for portrait mode.

The user terminal 300 may generate output image data for landscape mode when the received screen mode data of the display device 100 is landscape mode data, and generate output image data for portrait mode when the received screen mode data of the display device 100 is portrait mode data.

The user terminal 300 may transmit the generated output image data to the display device 100 (S1407).

The display device 100 may display the received output image data on the display 180 (S1409). The display device 100 may store the output image data received from the user terminal 300 in a buffer, render the image data stored in the buffer, and display the same image as the image being displayed on the user terminal 300 on the display 180.

On the other hand, when a screen mode is switched, the display device 100 according to an embodiment of the present disclosure may transmit screen mode data of the display device 100 of which the screen mode is switched to the user terminal 300 and receive and display output image data suitable for the switched screen mode.

Figure 15:
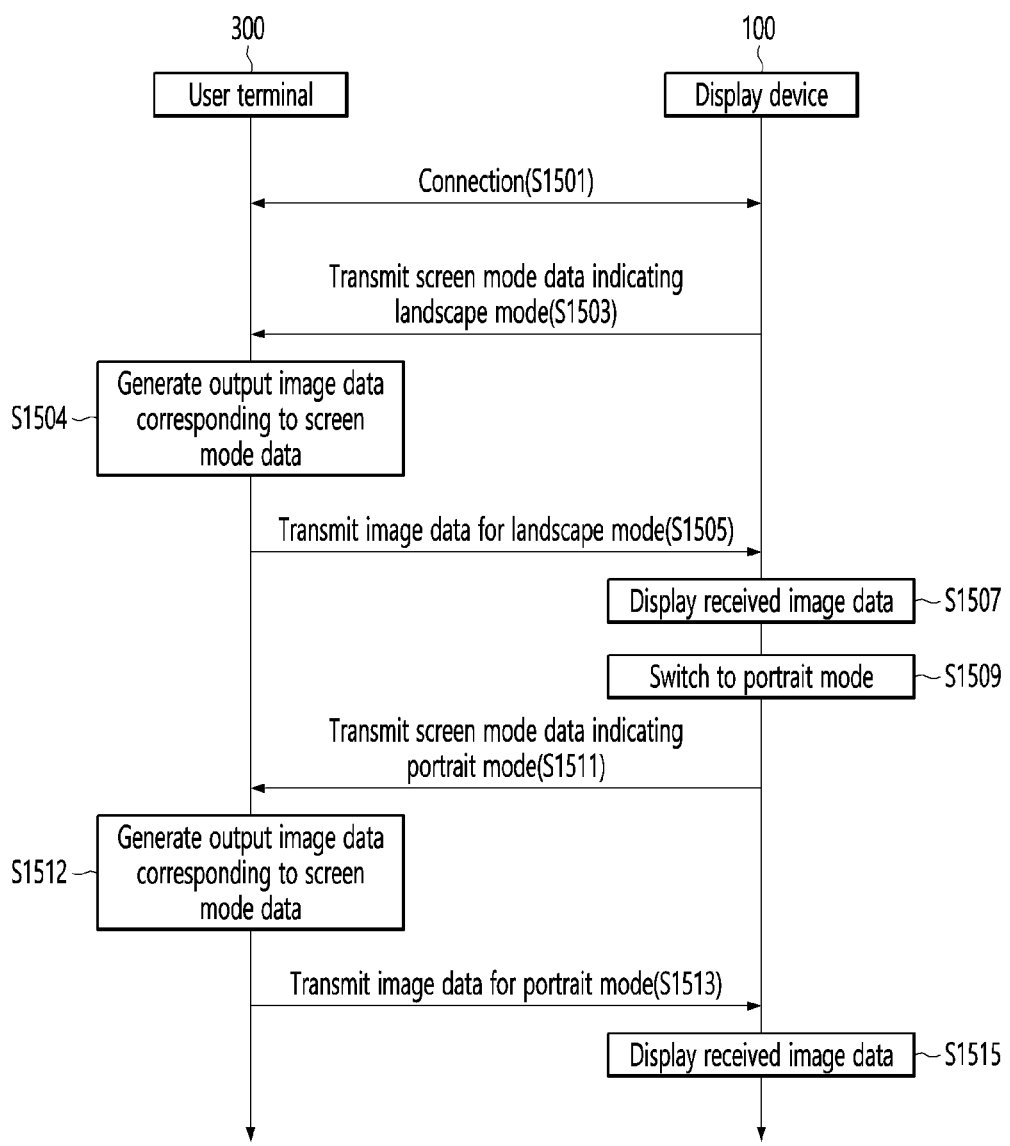
FIG. 15 is a ladder diagram illustrating an embodiment when a display device switches from landscape mode to portrait mode.
Figure 16:
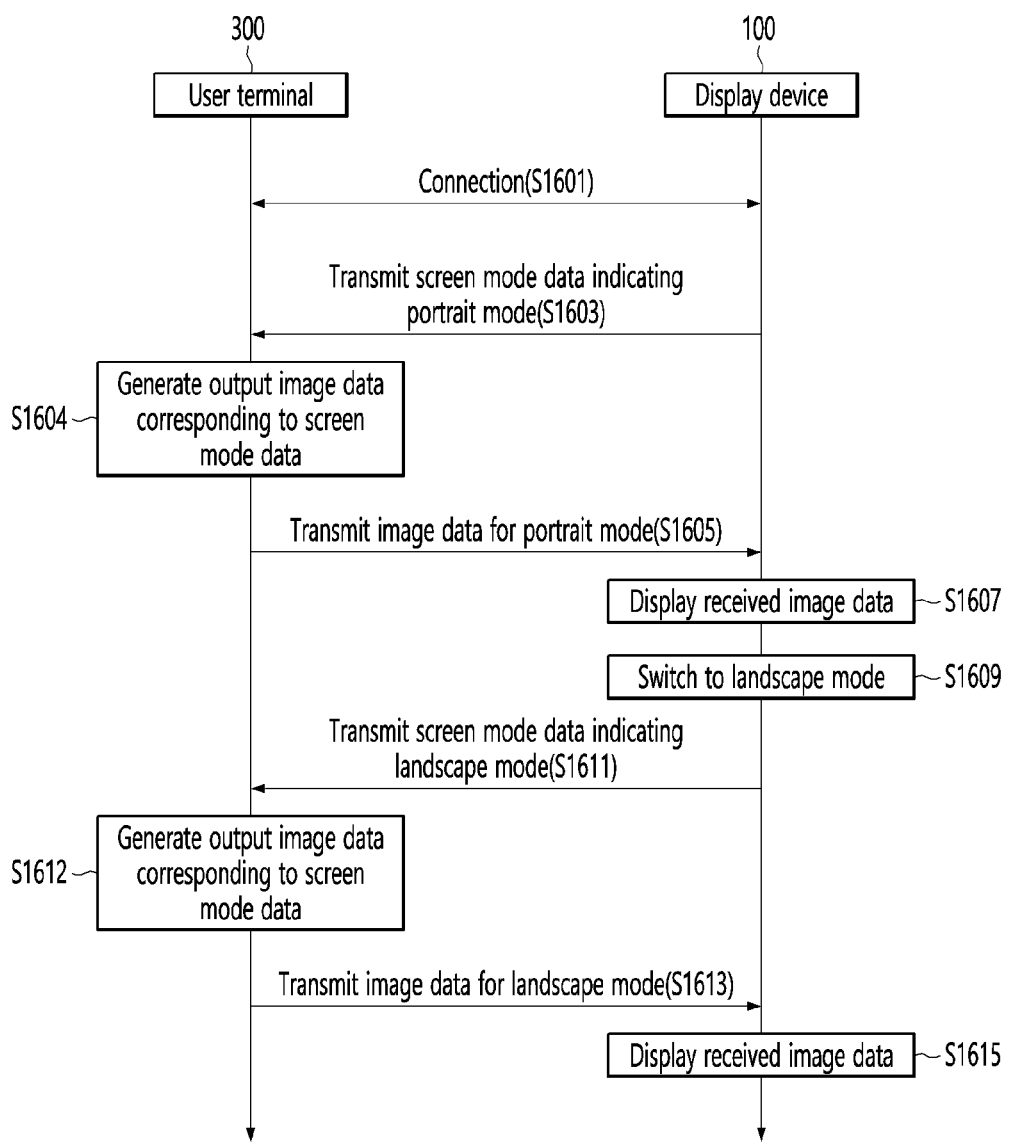
FIG. 16 is a ladder diagram illustrating an embodiment when a display device is switched from portrait mode to landscape mode.

FIG. 15 is a ladder diagram illustrating an embodiment when a display device switches from landscape mode to portrait mode, and FIG. 16 is a ladder diagram illustrating an embodiment when a display device is switched from portrait mode to landscape mode.

Referring to FIG. 15, when the display device 100 of the present disclosure is connected to the user terminal 300 while being in the landscape mode (S1501), the display device 100 may transmit screen mode data indicating that the display device 100 is in the landscape mode to the user terminal 300 (S1503), and receive and display output image data for landscape mode from the user terminal 300 (S1505). The display device 100 may display the received output image data on the display (S1507) and switch to portrait mode (S1509). When the display device 100 switches to portrait mode, the display device 100 may transmit screen mode data indicating that the display device is in portrait mode to the user terminal 300 (S1511) and receive output image data for portrait mode from the user terminal 300 (S1513). The display device 100 may display the received image data (S1515).

Each operation in the flowchart of FIG. 16 is the same as each operation in the flowchart of FIG. 15 except for a difference in the order of switching from landscape mode to portrait mode. Therefore, a description overlapping with FIG. 15 will be omitted.

Meanwhile, the user terminal 300 and the display device 100 according to an embodiment of the present disclosure may transmit and receive coordinate mapping data to and from each other.

The reason for this is that the coordinate system used by the display device 100 may be changed when the display device 100 is switched from landscape mode to portrait mode.

Next, coordinate mapping data will be described in detail with reference to FIG. 17.

Figure 17:
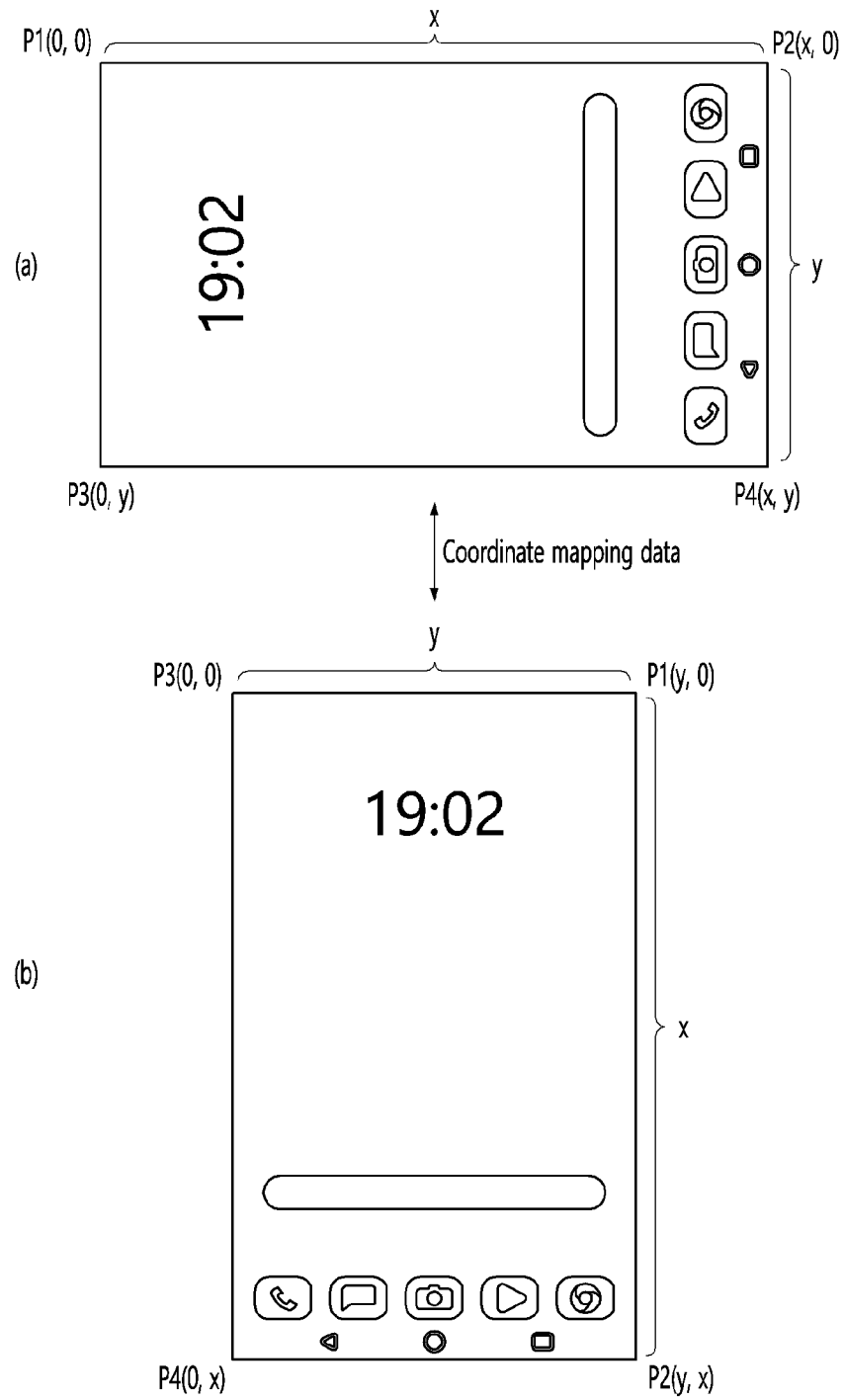
FIG. 17 is an exemplary diagram for describing coordinate mapping data according to an embodiment of the present disclosure.

FIG. 17 is an exemplary diagram for describing coordinate mapping data according to an embodiment of the present disclosure.

x and y may be changed depending on the resolution supported by the display device 100 or the user terminal 300.

For example, when the resolution supported by the display 180 is full HD (1920*1080), x may be 1920 and y may be 1080.

In addition, in the present specification, a reference point is set to a vertex at the upper left corner and the coordinates of the reference point are indicated as (0, 0), but this is merely an example and the display method of the coordinate system does not limit the scope of the present disclosure.

The display device 100 may be switched from (a) to (b) of FIG. 17, that is, from landscape mode to portrait mode. When the display device 100 receives an input signal or a touch input signal through a remote control device 200 on the display 180 in the portrait mode as shown in (b) of FIG. 17, the display device 100 may transform coordinates of the input signal received in a portrait mode coordinate system (e.g., y*x) into coordinates in a landscape mode coordinate system (e.g., x*y) and transmit the coordinates to the user terminal 300. In this case, the coordinate mapping data may refer to data for mapping a portrait screen to a landscape image. For example, the coordinate mapping data transmitted by the display device 100 may be data indicating that the coordinates of the first vertex P1 of the portrait screen are transformed from (y, 0) to (0, 0) of the landscape image, the coordinates of the second vertex P2 of the portrait screen are transformed from (y, x) to (x, 0) of the landscape image, the coordinates of the third vertex P3 of the portrait screen are transformed from (0, 0) to (0, y) of the landscape image, and the coordinates of the fourth vertex P4 of the portrait screen are transformed from (0, x) to (x, y) of the landscape image. This is merely an example, and the display device 100 may transform the entire portrait coordinate system (e.g., y*x) of the display 180 into the entire landscape coordinate system (e.g., x*y) and transmit the same to the user terminal 300, calculate the coordinates of each control input signal in the portrait mode coordinate system, transform each of the calculated coordinates into coordinates in the landscape mode coordinate system, and transmit the same.

The user terminal 300 may recognize the exact coordinates of the input signal received on the display 180 of the display device 100 based on the received coordinate mapping data. Accordingly, the user terminal 300 may execute a control command for the user terminal 300 input to the display device 100 based on the coordinate information of the input signal.

Also, the coordinate mapping data may be generated and transmitted in a direction opposite to that described above.

When the user terminal 300 transmits a portrait image (e.g., x*y) for portrait mode as shown in (a) of FIG. 17 to the display device 100, the user terminal 300 may also generate and transmit coordinate mapping data. In this case, the coordinate mapping data may refer to data for mapping a landscape image to a portrait screen. For example, the coordinate mapping data transmitted by the user terminal 300 may include information indicating that the coordinates of the first vertex P1 of a landscape image are transformed from (0, 0) to (y, 0) of the portrait screen, the coordinates of the second vertex P2 of the landscape image are transformed from (x, 0) to (x, y) of the portrait screen, the coordinates of the third vertex P3 of the landscape image are transformed from (0, y) to (o, 0) of the portrait screen, and the coordinates of the fourth vertex P4 of the landscape image are transformed from (x, y) to (0, x) of the portrait screen.

When the display device 100 receives an input signal or a touch input signal through a remote control device 200 on the display 180 in the portrait mode as shown in (b) of FIG. 17, the display device 100 may match the coordinates of the input signal to the coordinate mapping data received from the user terminal 300 and transmit the same back to the user terminal 300.

The user terminal 300 may recognize the exact coordinates of the input signal received from the display 180 of the display device 100 based on data to which the coordinates of the input signal from the display device 10 are matched.

Through the above-described embodiments, the display device 100 may transmit information about the screen mode to the user terminal 300, and receive and display image data suitable for the screen mode from the user terminal 300. That is, there is an advantage in that image data suitable for the screen mode can be received, thereby minimizing screen deterioration and increasing image data transmission efficiency.

The present disclosure described above may be embodied as computer readable codes on a medium in which a program is recorded. The computer-readable medium includes all kinds of recording devices in which data readable by a computer system is stored. Examples of the computer readable medium may include a hard disk drive (HDD), a solid state disk (SSD), a silicon disk drive (SDD), a ROM, a RAM, a CD-ROM, a magnetic tape, a floppy disk, an optical data storage device, and the like. The computer may also include the controller 180 of the display device 100. Accordingly, the above detailed description should not be construed as limiting in all respects and should be considered as illustrative. The scope of this specification should be determined by reasonable interpretation of the appended claims, and all changes within the equivalent scope of this specification are included in the scope of this specification.

The above description is merely illustrative of the technical idea of the present disclosure, and various modifications and variations may be made without departing from the essential characteristics of the present disclosure by those skilled in the art to which the present disclosure pertains.

Accordingly, the embodiment disclosed in the present disclosure is not intended to limit the technical idea of the present disclosure but to describe the present disclosure, and the scope of the technical idea of the present disclosure is not limited by the embodiment.

Each of the embodiments disclosed in this specification may be practiced alone or in combination with other embodiments.

The scope of protection of the present disclosure should be interpreted by the following claims, and all technical ideas within the scope equivalent thereto should be construed as being included in the scope of the present disclosure.

The invention claimed is:

1. A display device, comprising:
a wireless communication interface configured to perform connection with a user terminal;
a display configured to rotate from a landscape mode to a portrait mode or from the portrait mode to the landscape mode; and
a processor configured to transmit screen mode data of the display while being in a screen mode to the user terminal through the wireless communication interface when the screen mode of the display is changed, receive image data based on the screen mode data comprising a landscape mode data when the screen mode of the display is changed to the landscape mode, or receive image data based on the screen mode data comprising a portrait mode data when the screen mode of the display is changed to the portrait mode, and display the received image data on the display, the landscape mode of the display being a mode in which a long side of the display is in a horizontal direction and a short side of the display is in a vertical direction, and the portrait mode of the display being a mode in which the short side is in the horizontal direction and the long side is in the vertical direction.

2. The display device of claim 1, wherein the processor is further configured to transmit the screen mode data to the user terminal using a user input back channel (UIBC) parameter.

3. The display device of claim 1, wherein the processor is further configured to transmit the screen mode data to the user terminal using a Real-Time Streaming Protocol (RTSP) parameter.

4. The display device of claim 1, wherein the image data is image data for the landscape mode or image data for the portrait mode.

5. The display device of claim 4, wherein the image data for the landscape mode is image data including a practical image and a black image when the user terminal is in the portrait mode, and wherein the image data for the portrait mode is image data including no black image by rotating the practical image in landscape orientation when the user terminal is in the portrait mode.

6. The display device of claim 1, wherein the user terminal and the display device transmit and receive coordinate mapping data to and from each other when the display device is switched from the landscape mode to the portrait mode or from the portrait mode to the landscape mode.

7. A method for operating a display device including a display configured to rotate from a landscape mode to a portrait mode or from the portrait mode to the landscape mode, the method comprising:

connecting to a user terminal;

when the display device is connected to the user terminal, transmitting a first screen mode data of the display to the user terminal while being in a first screen mode, wherein the first screen mode data of the display includes at least one of a landscape mode data or a portrait mode data, the landscape mode of the display being a mode in which a long side of the display is in a horizontal direction and a short side of the display is in a vertical direction, and the portrait mode of the display being a mode in which the short side is in the horizontal direction and the long side is in the vertical direction;

receiving image data based on the first screen mode data from the user terminal;

when the first screen mode of the display is changed to a second screen mode, transmitting a second screen mode data of the display to the user terminal;

receiving image data based on the second screen mode data from the user terminal; and displaying the image data to the display.

8. The method of claim 7, wherein the first screen mode data includes the landscape mode data indicating that the display is in the landscape mode or the portrait mode data indicating that the display is in the portrait mode.

9. The method of claim 7, wherein the transmitting of the first screen mode data to the user terminal includes transmitting the first screen mode data to the user terminal using a user input back channel (UIBC) parameter.

10. The method of claim 7, wherein the transmitting of the first screen mode data to the user terminal includes transmitting the first screen mode data to the user terminal using a Real-Time Streaming Protocol (RTSP) parameter.

11. The method of claim 7, wherein the image data based on the first screen mode data is image data for the landscape mode or image data for the portrait mode.

12. The method of claim 11, wherein the image data for the landscape mode is image data including a practical image and a black image when the user terminal is in the portrait mode, and wherein the image data for the portrait mode is image data including no black image by rotating the practical image in landscape orientation when the user terminal is in the portrait mode.

13. A user terminal comprising:

a wireless communication interface configured to perform connection with a display device including a display configured to rotate from a landscape mode to a portrait mode or from the portrait mode to the landscape mode;

a display; and a processor configured to receive first screen mode data from the display device through the wireless communication interface when the user terminal is connected to the display device, generate first image data to be transmitted to the display device based on the first screen mode data, transmit the generated first image data to the display device, receive second screen mode data from the display device through the wireless communication interface when a first screen mode is changed to a second screen mode, generate second image data to be transmitted to the display device based on the second screen mode data, and transmit the generated second image data to the display device, wherein the first screen mode data includes a landscape mode data when the first screen mode is the landscape mode or the second screen mode data includes a portrait mode data when the second screen mode is the portrait mode, the landscape mode being a mode in which a long side of the display of the display device is in a horizontal direction and a short side of the display of the display device is in a vertical direction, and the portrait mode being a mode in which the short side is in the horizontal direction and the long side is in the vertical direction.

14. The method of claim 13, wherein the processor is further configured to generate the first image data for the landscape mode when the first screen mode data received from the display device is screen mode data indicating that the display device is in the landscape mode and generate the second image data for the portrait mode when the second screen mode data is screen mode data indicating that the display device is in the portrait mode in a case where the user terminal is in a portrait mode.

15. The display device of claim 1, wherein a coordinate of the landscape mode data transmitted to the user terminal includes information indicating that a coordinate of a first vertex P1 of a landscape image is (0, 0), a coordinate of a second vertex P2 of the landscape image is (x, 0), a coordinate of a third vertex P3 of the landscape image is (0, y), and a coordinate of a fourth vertex P4 of the landscape image is (x, y), and wherein a coordinate of the portrait mode data transmitted to the user terminal includes information indicating that a coordinate of a first vertex P1 of a portrait image is (y, 0) of a portrait screen, a coordinate of a second vertex P2 of the portrait image is (x, y) of the portrait screen, a coordinate of a third vertex P3 of the portrait image is (o, 0) of the portrait screen, and a coordinate of a fourth vertex P4 of the portrait image is (0, x) of the portrait screen.

* * * * *